US005970845A

United States Patent [19]

Beck

[11] Patent Number: 5,970,845

[45] Date of Patent: Oct. 26, 1999

[54] PISTON FOR A HYDROSTATIC AXIAL PISTON MACHINE

[75] Inventor: Josef Beck, Haigerloch, Germany

[73] Assignee: Brueninghaus Hydromatik GmbH, Elchingen, Germany

[21] Appl. No.: 09/066,409

[22] PCT Filed: Feb. 17, 1997

[86] PCT No.: PCT/EP97/00742

§ 371 Date: Apr. 28, 1998

§ 102(e) Date: Apr. 28, 1998

[87] PCT Pub. No.: WO97/35110

PCT Pub. Date: Sep. 25, 1997

[30] Foreign Application Priority Data

Mar. 18, 1996 [DE] Germany ........................... 196 10 595

[51] Int. Cl.[6] ........................................................ F16J 1/00

[52] U.S. Cl. ................................... 92/172; 92/71; 92/127

[58] Field of Search ............................... 92/71, 172, 126, 92/127; 417/269

[56] References Cited

U.S. PATENT DOCUMENTS

| | | | |
|---|---|---|---|
| 4,776,260 | 10/1988 | Vincze | 417/269 |
| 5,070,765 | 12/1991 | Parsons | 92/71 |

FOREIGN PATENT DOCUMENTS

| | | |
|---|---|---|
| 2 320 554 | 11/1973 | Germany . |
| 3 609 892 A1 | 10/1986 | Germany . |

*Primary Examiner*—Thomas E. Denion
*Attorney, Agent, or Firm*—Scully, Scott, Murphy & Presser

[57] ABSTRACT

There is described a piston for an axial piston machine with which the skirt surface (12) of the piston shaft (15) has, at its forward end region (Y) which transforms into the piston end face (11) and/or at its rear end region (X) lying towards the piston head, a bevel (16; 18; 19; 21) with continuously varied radiuses of curvature.

8 Claims, 3 Drawing Sheets

PISTON FOR A HYDROSTATIC AXIAL PISTON MACHINE

BACKGROUND OF THE INVENTION

1. Field of the Invention

The invention relates to a piston for a hydrostatic piston machine, in particular of swash plate construction having a cylinder drum, axial cylinder bores arranged therein, and a swash plate on which the pistons are supported. The pistons consist of a piston shaft with a piston end face and a cylindrical skirt surface moving back and forth in the cylinder bore, and a piston head supported on the swash plate.

2. Discussion of the Prior Art

Such pistons for axial piston machines are known for example from DE-A 23 20 554 and DE-A 36 09 892. At least the end regions of the cylindrical skirt surface towards the end pressure surface of these pistons are chamfered or rounded for various reasons. It is known to the skilled person that with such machines the piston play and the kinematics of such machines inevitably lead to a changing oblique positioning of the piston in the cylinder bore, which brings about increased friction and wear, in particular in the case of soft cylinder material, e.g. bronze. During the piston movement there arises at the wall of the cylinder bore a chafing effect due to the end edges of the piston/skirt surface. So that no chafing effect arises during the piston movement at the wall of the cylinder bore, the cylinder bores are in this region partially recessed. In order to reduce the wear of the walls of the cylinder, with the pistons according to DE A 23 20 554 the inner end section of the piston is bevelled towards the end pressure surface. With this configuration with bevelling (chamfering) wear still occurs in the absence of a recessing of the wall of the cylinder bore, at the entry and exit point of the piston shaft, since the bevelling has edges of its own.

It has been determined that these edges of the bevelling, or also edges chamfered with uniform, small radius of curvature, do not avoid the mentioned chafing effect. This chafing effect prevents the build up of the leakage oil lubrication film needed to discharge the heat of friction, and tends to jamming of the pistons in the cylinder bores (drawer effect).

SUMMARY OF THE INVENTION

The object of the invention is to provide a piston for a hydrostatic axial piston machine with which the wear at the entry and exit point of the piston shaft is further reduced and at the same time the hydraulic-mechanical and volumetric efficiency of the hydrostatic machine is improved.

For attaining this object, the piston according to the present invention is characterised in that the skirt surface of the piston shaft has a bevel with continuously varied radius of curvature in its forward end region where it transforms into the piston end face and/or in its rear end region lying towards the piston head. Thereby, not only a reduction of the friction at the piston shaft ends is achieved in that the bevel profile is adapted to the different degrees of oblique positioning of the piston in its back and forth movement, but also a lesser tolerance for the permitted piston play can be assumed. The invention makes possible an improved lubricating film build-up for the discharge of the heat of friction of the cylinder bore walls. Finally, there is attained a surprising improvement of the hydraulic-mechanical and volumetric efficiency—up to 3% has been measured—in that the bevel profile enlarges the effective end pressure surface of the piston.

Expedient configurations are indicated in the subclaims.

BRIEF DESCRIPTION OF THE DRAWINGS

Exemplary configurations of the invention are described below in more detail with reference to the drawings, which show.

DETAILED DESCRIPTION OF PREFERRED EMBODIMENTS

Figure 1:
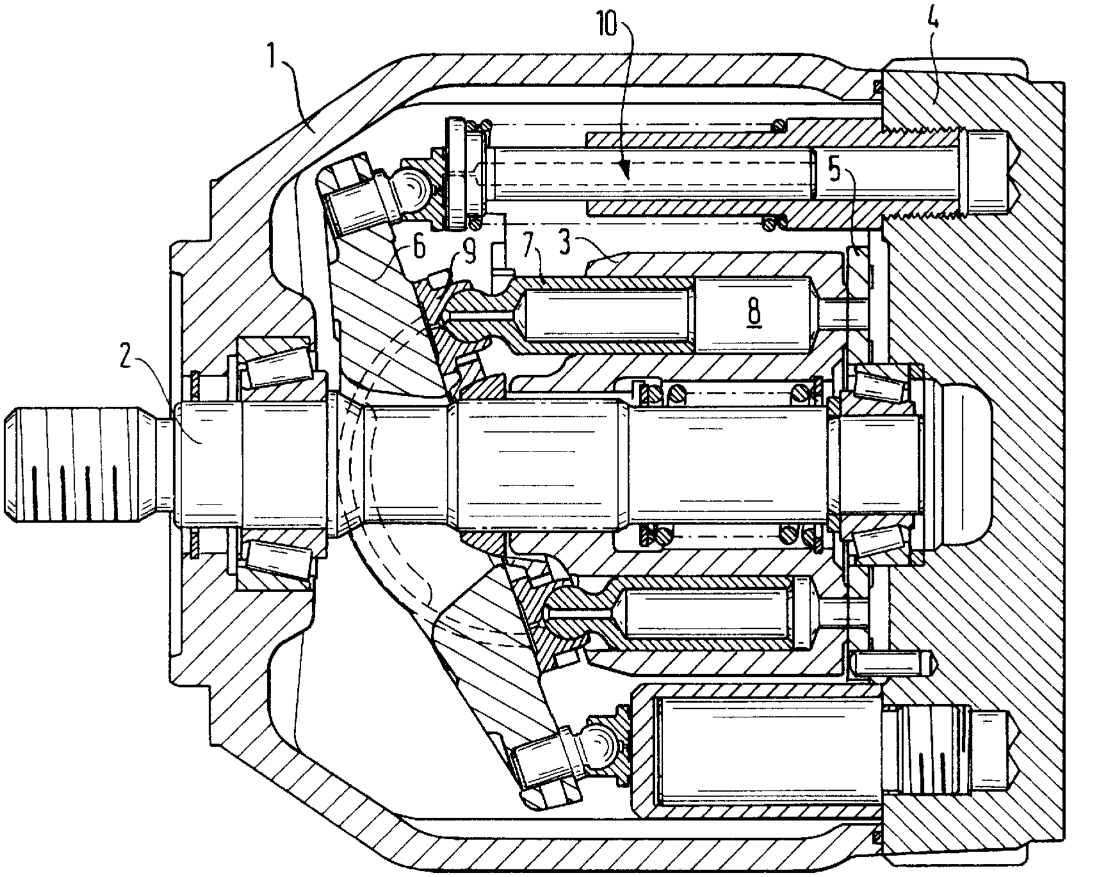
FIG. 1 an axial piston machine of swash plate construction, schematically in section, FIG. 2 schematically in a sectional view, cylinder drum, swash plate and pistons, with oblique positioning of the pistons in the cylinder bores illustrated greatly exaggerated, FIG. 3 a piston with slipper, in section, FIG. 4 the region Y in FIG. 3, as a detail to an enlarged scale, FIG. 5 the region X in FIG. 3, as a detail to an enlarged scale, FIG. 6 the region Y in FIG. 3 of another configuration, as a detail to an enlarged scale, and FIG. 7 the region X in FIG. 3 of the other configuration, as a detail to an enlarged scale.
Figure 2:
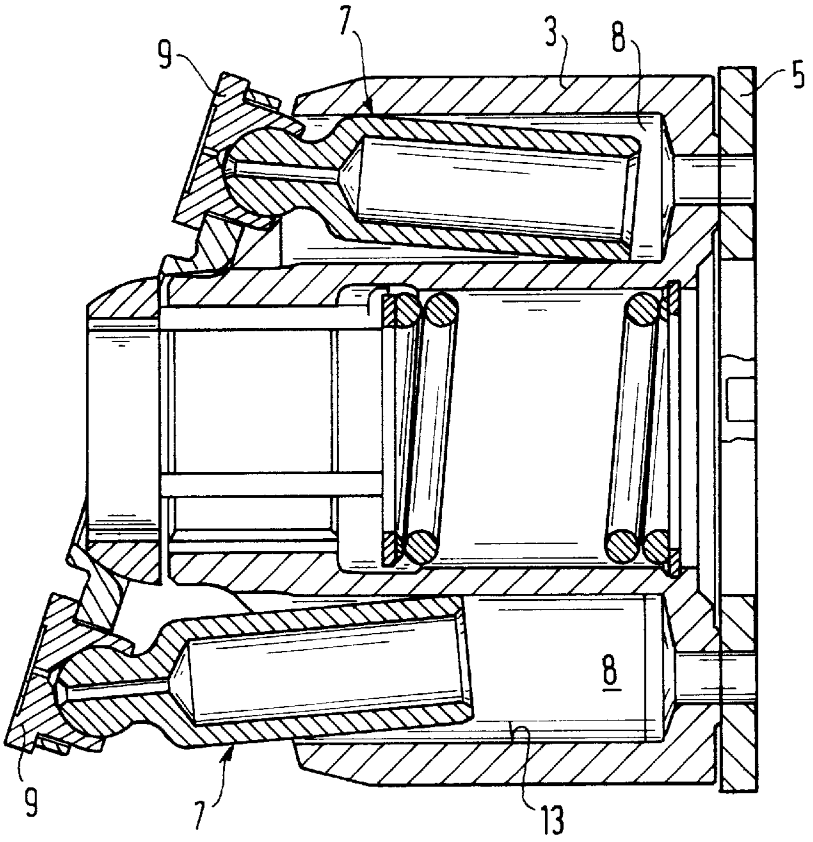
Figure 3:
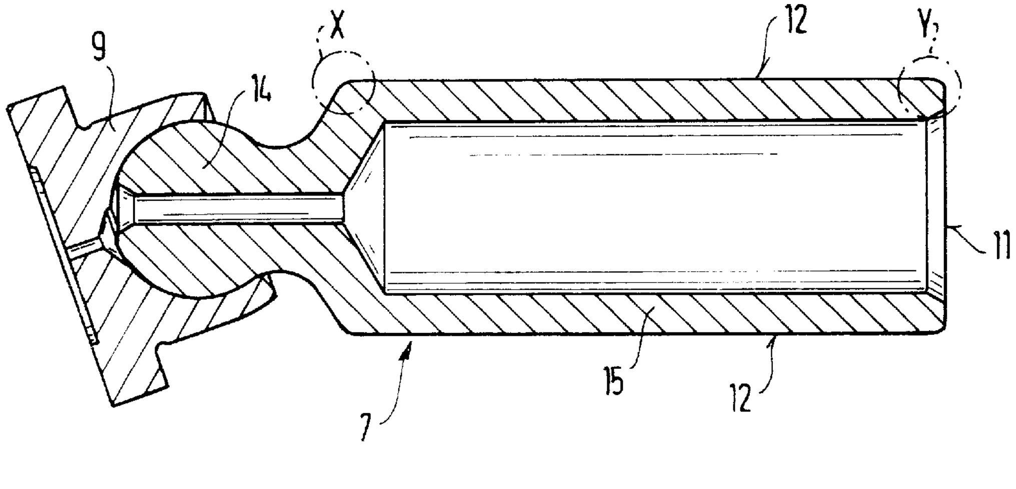

The axial piston machine of swash plate construction, schematically illustrated in section in FIG. 1, comprises a housing 1, the input/output shaft 2, the cylinder drum 3, the housing cover 4 with control plate 5, the swash plate 6, the pistons 7 which move in cylinder bores 8 of the cylinder drum 3 in that they are supported via slippers 9 on the swash plate 6. The tilt position of the swash plate 6 can be altered by means of a setting device 10, and therewith the stroke volume of the machine can be changed. Overall, this axial piston machine is of conventional construction and a more detailed description is not necessary.

The pistons 7, in the illustrated configuration hollow pistons, consist of a piston shaft 15 with a pressure-effective piston end face 11. The piston shaft 15 has a cylindrical skirt surface 12 which slides on the wall 13 of the cylinder bore 8. On the side away from the piston end face 11 the piston shaft transforms into the piston head 14, which is mounted in the slipper 9. To make the kinematics more clear, the oblique positioning of the pistons 7 in the cylinder bores 8 is illustrated greatly exaggerated.

Figure 5:
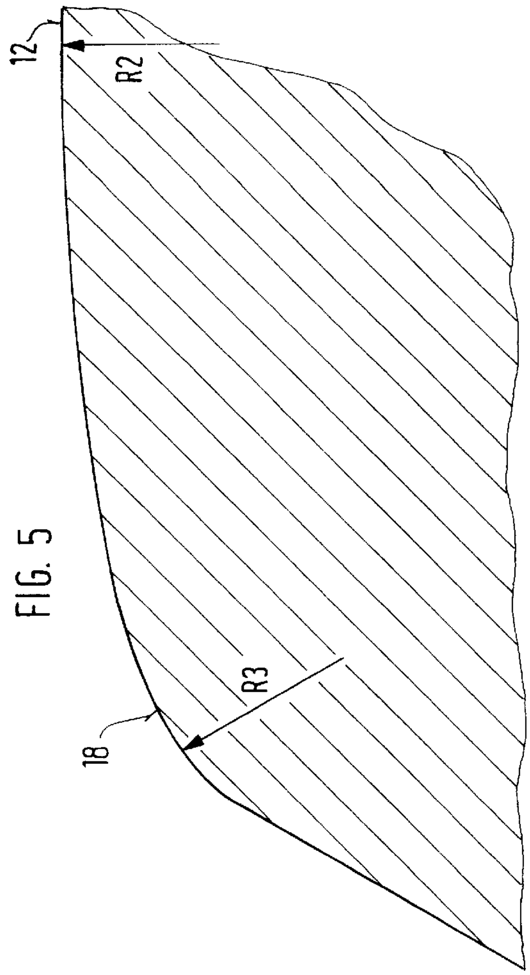
Figure 7:
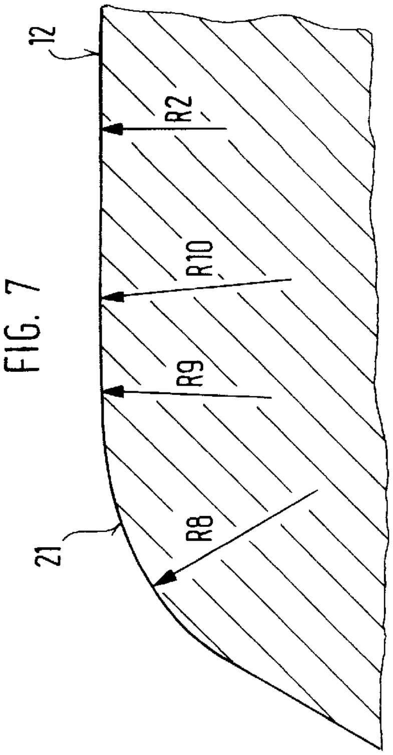

The decisive locations for the occurrence of the chafing effect are the end regions of the piston shaft. The forward end region of the piston shaft 15, in which the piston shaft 15 transforms into the piston end face 11, is designated with Y and is illustrated to an enlarged scale in FIGS. 4 and 6 for the exemplary configurations. The rear end region of the piston shaft 15 is designated with X and is illustrated to an enlarged scale in FIGS. 5 and 7 for the two configurations.

Figure 4:
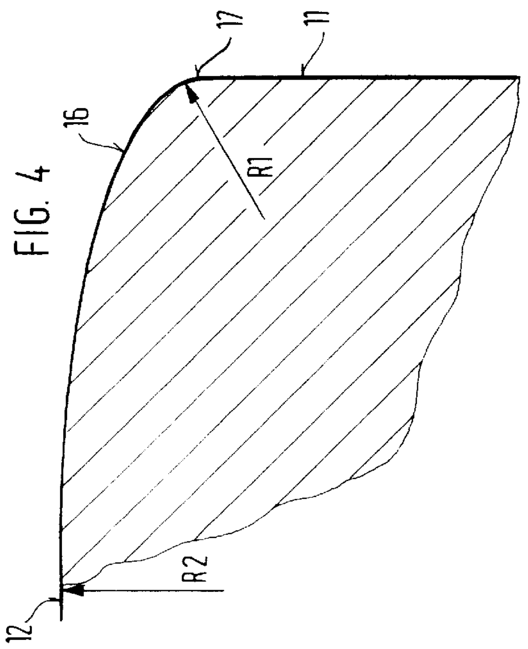

The bevel profile 16 according to FIG. 4 begins at the piston end face 11 with a small radius of curvature R1 and continues up to the skirt surface 12 with continuously increasing radiuses of curvature, in which the radius of curvature R2 reaches infinity. The bevel profile 16 runs out into the skirt surface becoming continuously flatter. The edge 17 arising between the piston end face 11 and the beginning of the bevel profile 16, having small radius of curvature R1, is of no functional significance since this edge does not come into the region of the walls of the cylinder bores in any oblique position of the piston. In general, this edge 17 is placed so far inwardly towards the piston middle axis, i.e. the bevel profile 16 is so large, that it also serves as introduction phase in the installation of the piston, for avoidance of damage to the cylinder bore walls. The bevel profile 18 in the rear end region of the piston shaft 15 according to FIG. 5 begins from the side of the piston head 14 with small radius of curvature R3, and runs out into the skirt surface 12 of the piston with radiuses of curvature becoming constantly larger, the bevel achieving the radius of curvature R2 of infinity at the skirt surface.

Figure 6:
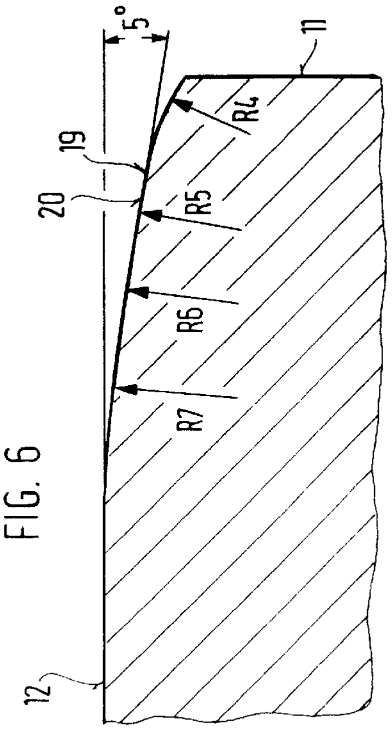

With the configuration according to FIG. 6, the bevel profile 19 on the side of the piston end face 11 again first has a small radius R4 which remaining the same or becoming larger continuously transforms into a larger radius of curvature R5. This radius of curvature R5 may also be infinity, which means that in this region a conical annular bevel pressure surface 20 is formed. Then, the bevel profile 19 continues with radius of curvature R6, again smaller than the radius of curvature R5, whereby the radiuses of curvature R7 etc. again become continuously larger till they attain the radius of curvature R2 with the value infinity of the skirt surface 12 of the piston, so that the bevel profile 19 here also transforms continuously and flatly into the skirt surface 12. The conical annular pressure surface 20 increases the hydraulic-volumetric efficiency of the piston. The angle between an axial surface line of the pressure surface 20 and an axial surface line of the skirt surface 12 of the piston should be less than 5°. The bevel profile 21 according to FIG. 7, in the rear end region X, begins in this configuration from the piston head side with a constant radius of curvature R8, has a very large radius of curvature R9, remaining constant over a small region, and then transforms with a radius of curvature initially somewhat less than R9 into the then again increasing radiuses of curvature R10, until this attains the radius of curvature R2 of infinity of the skirt surface 12.

I claim:

1. Piston for a hydrostatic axial piston machine of swash plate construction having a cylinder drum (3), axial cylinder bores (8) arranged in said cylinder drum, and a swash plate (6) at which the pistons (7), movable back and forth in the cylinder bores, are supported, comprising a piston shaft (15) having a piston end face and having an adjoining cylindrical skirt surface (12) in the cylinder bore, and a piston head (14) supported on the swash plate (6), characterized in that, the skirt surface (12) of the piston shaft (15) has a bevel (16; 18; 19; 21) with continuously varied radiuses of curvature at a forward end region (Y) of the skirt surface which transforms into the piston end face (11) and at a rear end region of the skirt surface (X) lying towards the piston head.

2. Piston according to claim 1, characterised in that, the bevel (16; 18; 19; 21) of the skirt surface, beginning from the piston shaft end with a small radius of curvature and then radiuses of curvature becoming larger, runs out with infinite radius into the cylindrical skirt surface (12).

3. Piston according to claim 1, characterised in that, the continuous variation of the radiuses of curvature is so selected that an at least approximately logarithmically developing bevel profile (16; 18) is provided at the end regions of the skirt surface (12).

4. Piston according to claim 1, characterised in that, the bevel (19; 21) of the skirt surface begins from the piston shaft end with a small radius of curvature (R4; R8), continues with a large, essentially infinite, radius of curvature (R5; R9) with the formation of a conical annular bevel pressure surface (20) and then with again smaller and then increasing radiuses of curvature (R7) transforms into the cylindrical skirt surface with infinite radius of curvature (R2).

5. Piston according to claim 4, characterized in that, a conical angle subtended between the bevel pressure surface (20) and the cylindrical skirt surface (12) is smaller than 5°.

6. Piston according to claim 3, characterised in that, the bevel profile is different at the forward end region and at the rearward end region of the skirt surface of the piston shaft.

7. Piston according to claim 2, characterized in that, the continues variation of the radiuses of curvature is so selected that an at least approximately logarithmically developing bevel profile (16;18) is provided at the end regions of the skirt surface (12).

8. Piston according to claim 7, characterized in that, the bevel profile is different at the forward end region and at the rearward end region of the skirt surface of the piston shaft.

* * * * *